US012726825B2

(12) United States Patent
Mariyani et al.

(10) Patent No.: US 12,726,825 B2
(45) **Date of Patent: *Sep. 1, 2026**

(54) AUTOMATED SUSPECT DEVICE FILTERING ON EQUIPMENT IDENTITY REGISTERS

(71) Applicant: T-MOBILE INNOVATIONS LLC, Overland Park, KS (US)

(72) Inventors: Anil Kumar Mariyani, Ashburn, VA (US); Anjj Sharma, Broadlands, VA (US); Chris Jensen, Snoqualmie, WA (US); Tupalli Shruthisagar, Aldie, VA (US); Rajil Malhotra, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/602,851

(22) Filed: Mar. 12, 2024

(65) Prior Publication Data

US 2024/0224045 A1 Jul. 4, 2024

Related U.S. Application Data

(63) Continuation of application No. 17/394,217, filed on Aug. 4, 2021, now Pat. No. 11,930,366.

(51) Int. Cl.
*H04W 12/122* (2021.01)
*H04L 9/40* (2022.01)
(Continued)

(52) U.S. Cl.
CPC ......... *H04W 12/37* (2021.01); *H04L 63/0876* (2013.01); *H04W 8/02* (2013.01);
(Continued)

(58) Field of Classification Search
CPC ........... H04L 63/1458; H04L 63/0876; H04W 28/0284; H04W 12/72; H04W 48/02;
(Continued)

(56) References Cited

U.S. PATENT DOCUMENTS 7,570,941 B2 8/2009 Mahajan
9,094,839 B2 7/2015 Shaikh et al.
(Continued)

FOREIGN PATENT DOCUMENTS

CN 105636049 A * 6/2016
CN 101540758 A * 9/2023
(Continued)

OTHER PUBLICATIONS

"Max authentication failures", Jun. 11, 2012, obtained online from <https://community.arubanetworks.com/discussion/max-authentication-failures>, retrieved on May 31, 2025. (Year: 2012).*
(Continued)

*Primary Examiner* — Zhimei Zhu
(74) *Attorney, Agent, or Firm* — SHOOK, HARDY & BACON L.L.P.

(57) ABSTRACT

Embodiments of the present disclosure are directed to systems and methods for improving wireless network services by carrying out various procedures to identify and filter suspect user devices. A network function may monitor a plurality of network service requests from a particular user device and determine, based on the plurality of network services requests, that the requesting user device is engaged in suspicious activity. Upon such a determination, the network function may initiate one or more enforcement actions by communicating an instruction to an equipment identity register to add the requesting user device to a suspect device list stored on a unified data repository.

18 Claims, 5 Drawing Sheets

(51) Int. Cl.
*H04W 8/02* (2009.01)
*H04W 12/00* (2021.01)
*H04W 12/37* (2021.01)
*H04W 12/60* (2021.01)
*H04W 12/71* (2021.01)

(52) U.S. Cl.
CPC ....... *H04W 12/009* (2019.01); *H04W 12/122* (2021.01); *H04W 12/66* (2021.01); *H04W 12/71* (2021.01); *H04L 63/1458* (2013.01)

(58) Field of Classification Search
CPC . H04W 48/06; H04W 12/088; H04W 12/122; H04W 12/71; H04W 24/04; H04W 24/08; H04W 28/12; H04W 60/00; H04W 8/02; H04W 8/04; H04W 8/06; H04W 12/37; H04W 12/009; H04W 12/66; H04W 12/12
See application file for complete search history.

(56) References Cited

U.S. PATENT DOCUMENTS 9,380,630 B2 * 6/2016 Youtz .................... H04W 76/18
10,749,867 B1 * 8/2020 Litani ................. H04L 63/0876
10,951,461 B2 3/2021 Ganu et al.
2007/0077912 A1 4/2007 Mahajan
2012/0014332 A1 * 1/2012 Smith ................... H04W 72/04 370/329
2012/0028606 A1 * 2/2012 Bobotek ............... H04L 51/212 455/411
2014/0179263 A1 * 6/2014 Collins ................. H04W 12/12 455/405
2016/0029246 A1 1/2016 Mishra et al.
2016/0099963 A1 4/2016 Mahaffey et al.
2017/0006522 A1 1/2017 Nishimura et al.
2018/0007534 A1 1/2018 Thakolsri et al.
2018/0034814 A1 2/2018 Tachikawa
2019/0297083 A1 9/2019 Li et al.
2020/0187048 A1 * 6/2020 Mishra .................... H04L 47/32
2021/0144555 A1 * 5/2021 Kim .................... H04L 63/1458
2021/0203575 A1 7/2021 Hanetz et al.
2021/0273783 A1 9/2021 Park
2021/0367888 A1 11/2021 Ramamurthi
2022/0006756 A1 1/2022 Ramaswamy et al.
2022/0345914 A1 10/2022 Kim et al.
2023/0164590 A1 * 5/2023 Yamine ................. H04W 24/02 370/329

FOREIGN PATENT DOCUMENTS

EP 2334011 A1 * 6/2011 .......... G06F 11/2074
EP 2334011 B1 2/2013
JP 2020-005102 A 1/2020
KR 10-2010-0072973 A 7/2010
KR 10-2021-0050978 A 5/2021
WO WO-2014105995 A1 * 7/2014 ......... H04L 63/1425
WO 2017/092823 A1 6/2017

OTHER PUBLICATIONS

Dzmitry Reshytnik, "Prevent Bad Signals From Harming Network Availability", obtained online from <https://www.paloaltonetworks.com/blog/2018/02/sp-prevent-bad-signals-harming-network-availability/#:~:text=With%20these%20requirements%20satisfied,%20a,Multiple%20Mobile%20Network%20Peering%20Points.> (Year: 2018).*

Broadforward BV, Equipment Identity Register (EIR), https://www.broadforward.com/equipment-identity-register-eir/, Mar. 1, 2021, Amersfoort, Netherlands, 4 pages.

Nicole Singh, "What is the 5G Access and MobilityManagement Function (AMF)?", Jan. 5, 2023, obtained online from <https://techcommunity.microsoft.com/t5/azure-for-operators-blog/what-is-the-5g-access-and-mobility-management-function-amf/ba-p/3707685>, retrieved on May 6, 2023.

Robocall Strike Force Report, Oct. 26, 2016, obtained from <https://transition.fcc.gov/cgb/Robocall-Strike-Force-Final-Report.pdf>, retrieved on Oct. 20, 2023 (Year: 2016).

Notice of Allowance received for U.S. Appl. No. 17/394,219, mailed on Jul. 30, 2024, 11 pages.

Final Office Action received for U.S. Appl. No. 17/394,219, mailed on Mar. 27, 2024, 21 pages.

* cited by examiner 210
5G CORE
EIR
214
NF1
216
NF2
218
AMF
212
UDR
220
UPF
222
236
230
IMS CORE
P-CSCF
232
S/I - CSCF
234
PSTN
244
OTHER IMS
240
242
206
204
202
200

AUTOMATED SUSPECT DEVICE FILTERING ON EQUIPMENT IDENTITY REGISTERS

CROSS-REFERENCE TO RELATED APPLICATIONS

This application is a continuation of, and claims priority to, U.S. patent application Ser. No. 17/394,217, filed on Aug. 4, 2021, the entirety of which is incorporated herein by reference.

SUMMARY

The present disclosure is directed, in part to performing automated device filtering on equipment identity registers or other networked computing components, substantially as shown and/or described in connection with at least one of the figures, and as set forth more completely in the claims.

According to various aspects of the technology, automated device identity filtering is based on suspicious or anomalous behavior of a particular device. Because conventional solutions for blacklisting particular devices is the result of manual review and entry, networks are slow to adapt and prevent undesirable device attach behavior. Specifically, whether due to spam or other malicious behavior or whether due to technical issues or faults resulting in rogue behavior, when unauthorized devices repeatedly make unsuccessful attempts to attach or access a network, they have the effect of denying service to legitimate activity. Once a rogue or malicious device has been blacklisted, access requests are preempted, preventing denial of service. Using a particular method for automated filtering of malicious or rogue devices, blacklisting devices becomes a dynamic and expedited process that maintains network functionality.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
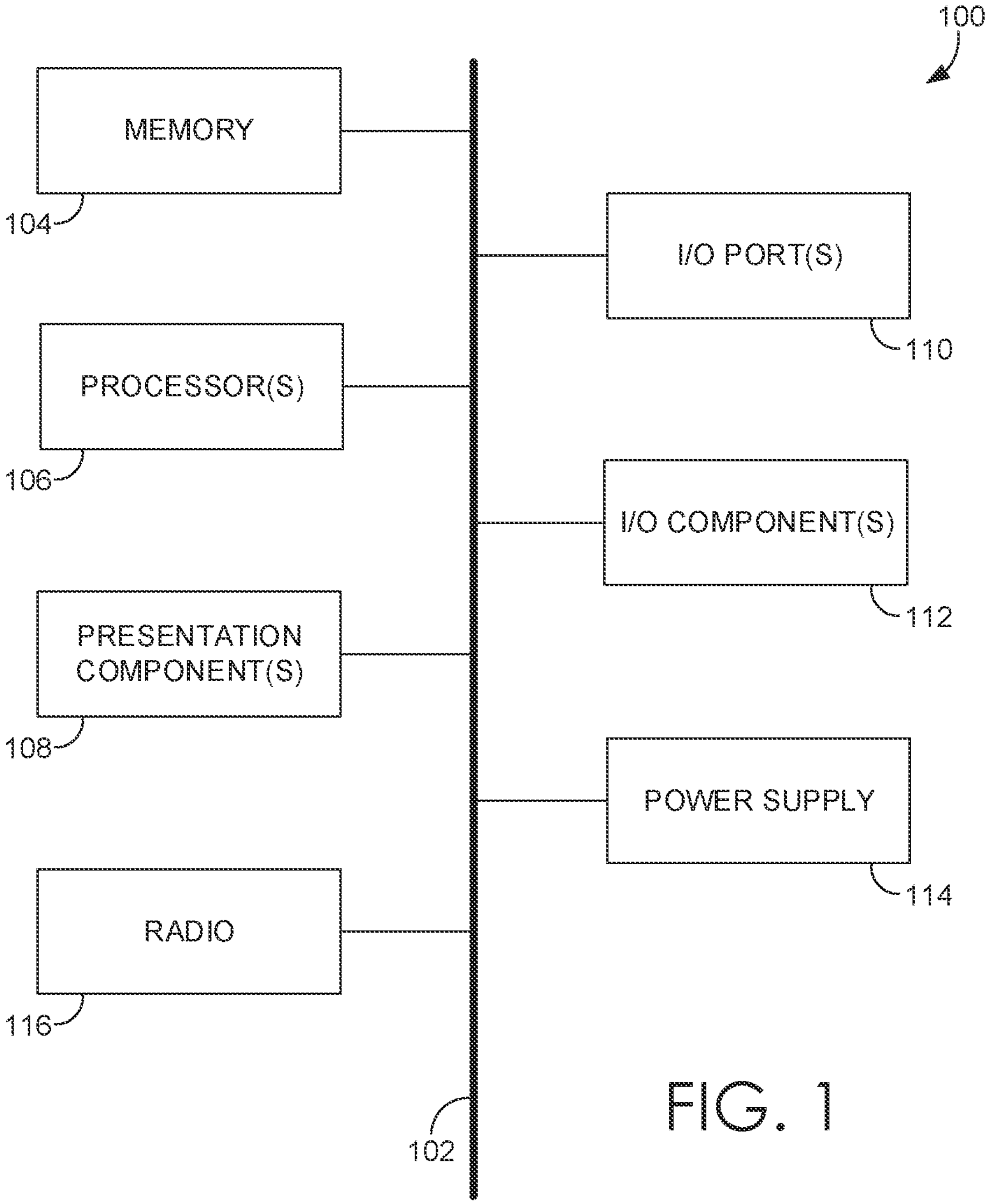
FIG. 1 illustrates an exemplary computing device for use with the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media. Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media. Implementations of the present disclosure may be described in the general context of computer code or machine-useable instructions, including computer-executable instructions such as program components, being executed by a computer or other computer processing component. Generally, program components, including routines, programs, objects, components, data structures, and the like, refer to code that performs particular tasks or implements particular abstract data types. Implementations of the present disclosure may also be practiced in distributed computing environments where tasks are performed by remote-processing devices that are linked through a communications network.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, network operators maintain, and sometimes even share, lists of user devices that are suspected or known to engage in fraudulent or spam activities. Conventionally, user devices would be considered to be "whitelisted," or permitted to operate nominally unless they were included on a "grey" or "black" list, and there was no common place in the network to identify and report suspect behavior. As part of network attachment, an identifier associated with a particular user device would be checked against the grey/black lists and permitted access to the network accordingly. However, the grey/black lists were manually maintained; that is, there is no way for these lists to be updated with the frequency and comprehensiveness necessitated by the dynamic nature and massive volume of modern user devices. With the growing number of internet of things (IoT) devices and 5G devices, network operators have an increased need to ensure that attached devices are legitimate. Historically, as few as one device on a network can cause vastly disproportionate degradations in key performance indicators due to spam or malicious attach requests and the like.

In order to solve the problems faced by conventional solutions for filtering suspect and/or malicious devices, the present disclosure is directed to systems, methods, and computer readable media that increase the effectiveness and responsiveness of spam or rogue device filtering. In order to improve suspect device filtering, network functions are configured to monitor and report suspicious device behavior, for instance to an equipment identity register. If, according to any one or more suspect activity procedures carried out by the network function, a particular user device is determined to be suspect, it is automatically added to a suspect device list or a blocked list, stored in an accessible data repository, in order to modify or prevent future network access for the offending user device.

Accordingly, a first aspect of the present disclosure is directed to a method for suspect device filtering in a wireless communication network, the method comprising receiving, at a radio access network, a plurality of requests for a network service from a user device, wherein the user device is associated with a permanent device identifier. The method further comprises communicating the plurality of requests for the network service to a network function, wherein the network function is associated with the provision of the requested network service. The method further comprises determining, by the network function, and based at least in part on the receipt of the plurality of requests for the network service from the user device during a first predetermined time period, that the user device is suspect. The method further comprises adding the user device to a suspect device list, wherein the suspect device list is stored on a data repository.

A second aspect of the present disclosure is directed to a system a data repository; an equipment identity register; and an access mobility function. The access mobility function comprises one or more computer components configured to perform a method comprising receiving, via a radio access network, a plurality of attach requests from a user device during a predetermined period of time. The access mobility function is further configured to determine that the user device is suspect and cause, via the equipment identity register, the user device to be added to a suspect device list, wherein the suspect device list is stored on the data repository.

According to another aspect of the technology described herein, one or more computer-readable media is provided having computer-executable instructions embodied thereon that, when executed, cause the one or more processors to perform a method comprising receiving, at an internet protocol multimedia system, a plurality of messaging attempts from a user device associated with a mobile-originating or mobile-terminating call. The method further comprises communicating the plurality of messaging attempts to a call session control function. The method further comprises. The method further comprises determining, by the call session control function, and based at least in part on the receipt of the plurality of messaging attempts during a predetermined time period, that the user device is suspect. The method further comprises adding the user device to a suspect device list, wherein the suspect device list is stored on a data repository.

Referring to FIG. 1, a diagram is depicted of an exemplary computing environment suitable for use with implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more buses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as “workstation,” “server,” “laptop,” “handheld device,” etc., as all are contemplated within the scope of FIG. 1 and refer to “computer” or “computing device.”

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. In aspects, the radio 116 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VOIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
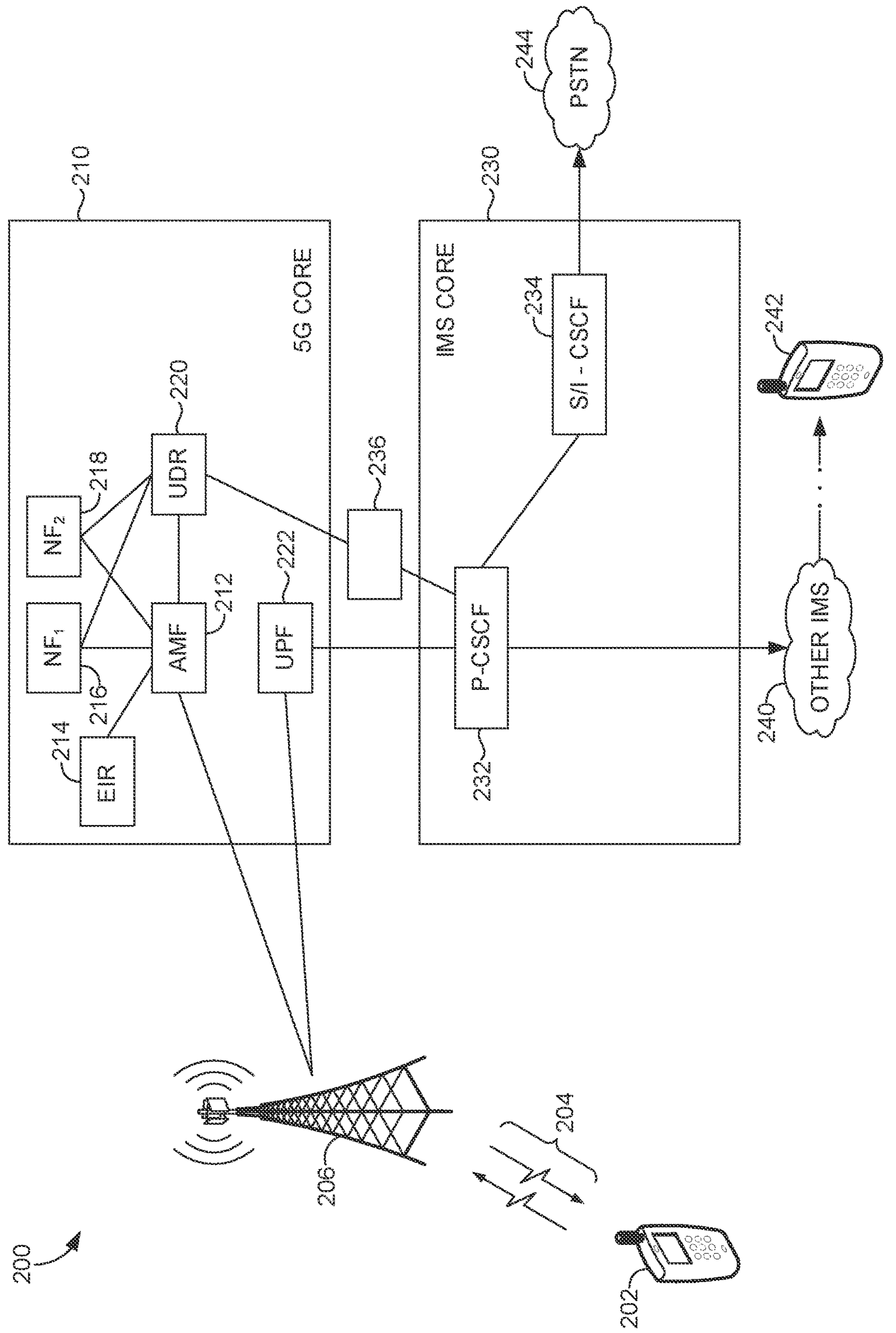
FIG. 2 illustrates a diagram of an exemplary network environment in which implementations of the present disclosure may be employed.

Turning now to FIG. 2, an exemplary network environment is illustrated in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 represents a high level and simplified view of relevant portions of a modern wireless telecommunication network. At a high level, the network environment 200 may generally be said to comprise one or more UEs, such as a first UE 202 and/or a second UE 242, a radio access network (RAN) 206, a network core 210, and an IMS core 230, though in some implementations, it may not be necessary for certain features to be present. For example, in some aspects, the network environment 200 may not comprise a distinct IMS core 230, but rather may implement one or more features of the IMS core 230 within other portions of the network or may not implement them at all, depending on various carrier preferences. The network environment 200 is generally configured for wirelessly connecting the first UE 202 to other UEs, such as the second UE 242, to other telecommunication networks such as a publicly-switched telecommunication network (PSTN) 244, or data or services that may be accessible on one or more application servers or other functions, nodes, or servers not pictured in FIG. 2 so as not to obscure the focus of the present disclosure.

The RAN 206 is generally configured to transmit and receive one or more signals 204 between a base station and the first UE 202. The one or more signals 204 comprise one or more uplink signals for which the RAN 206 is configured to receive from the first UE 202. In response to receiving certain requests from the first UE 202, the RAN 206 may communicate with the network core 210. For example, in order for the first UE 202 to connect to a desired network service (e.g., PSTN call, voice over LTE (VOLTE) call, voice over new radio (VoNR), data, or the like), the first UE 202 may communicate an attach request to the RAN 206, which may, in response may communicate a registration request to the network core 210.

Relevant to the present disclosure, one or more modules of the network core 210 may work cooperatively to determine whether the first UE 202 is authorized to access the desired network service. As used herein, the terms "function" and "module" are used to describe a computer processing component and/or one or more computer executable services being executed on one or more computer processing components. For example, the network core 210 may comprise modules or functions that include any one or more of a core access and mobility management function (AMF) 212, an equipment identity register (EIR) module 214, a first network function (NF) 216, a second NF 218, a unified data repository (UDR) 220, and a user plane function (UPF) 222. Notably, the preceding nomenclature is used with respect to the 3GPP 5G architecture; in other aspects, each of the preceding functions and/or modules may take different forms, including consolidated or distributed forms that perform the same general operations. For example, the AMF 212 in the 3GPP 5G architecture is configured for various functions relating to security and access management and authorization, including registration management, connection management, paging, and mobility management; in other forms, such as a 4G architecture, the AMF 212 of FIG. 2 may take the form of a mobility management entity (MME).

The network environment 200 comprises an EIR 214. Though shown as disposed within the network core 210, it is expressly contemplated that the location illustrated in network environment 200 is non-limiting; for example, the EIR 214 may be disposed between the RAN 206 and the core network 210 (i.e., network edge) or may be isolated as a stand-alone module. The EIR 214 is generally configured for determining whether the first UE 202 is whitelisted (permitted to access the desired network service), greylisted (access to the desired network service is controlled; for example, access may be monitored, temporarily suspended, or otherwise restricted), or blacklisted (access to the desired network service or the network, generally, is denied). In aspects, the EIR 214 may communicate with one or more functions or modules in order to affect a particular outcome; for example, in one aspect the EIR 214 may communicate to the AMF 212 that the first UE 202 is on the blacklist, which may cause the AMF 212 to automatically deny or ignore subsequent requests that originate from the first UE 202. In aspects, the EIR 214 may comprise a direct interface (e.g., HTTP2 interface) that permits access (e.g., by a technician in a network operations center or on a customer care team) for querying the EIR 214, including to determine EIR 214 functions or to access/monitor one or more of the whitelist, greylist, and/or blacklist.

The network environment 200 may additionally comprise one or more network functions. Generally shown as a first NF 216 and a second NF 218, it is contemplated that the network environment 200 or the core network 210 may have more or fewer NFs; for example, the second NF 218 may be excluded or there may be one or more additional NFs. In aspects, each of the first NF 216 and the second NF 218 may be one selected from a group of NFs comprising: a session management function (SMF), policy control function (PCF), authentication server function (AUSF), application function (AF), network exposure function (NEF), NF repository function (NRF), and a network slice selection function (NSSF).

The network environment 200 also comprises a unified data repository (UDR) 220 for storing information relating to access control. The UDR 220 is generally configured to store information relating to subscriber information and access and may be accessible by multiple different NFs in order to perform desirable functions. For example, the UDR 220 may be accessed by the AMF 212 in order to determine subscriber information, accessed by a PCF to obtain policy related data, accessed by a NEF to obtain data that is permitted for exposure to third party applications, and/or accessed by the EIR 214 in order to determine whether a device is on a whitelist, greylist, or blacklist (which may be collectively stored as an EIR subscription tree). In addition to being accessible by one or more NFs, such as those described herein, the one or more NFs may also write information to the UDR 220. Similar to the AMF 212, the network environment 200 illustrates the UDR 220 according to a version of the 3GPP 5G architecture; in other network architectures, it is expressly conceived that the UDR 220 may take any desirable form of a data repository capable of being written to and accessed by one or more NFs or other functions or modules (e.g., a call session control function). Though not illustrated so as to focus on the novel aspects of the present disclosure, the network environment may comprise a unified data management module (UDM) which may facilitate communication between an NF, function, or module and the UDR 220.

The network environment 200 may also comprise a user plane function (UPF) 222. The UPF 222 is generally configured to facilitate user plane operation relating to packet routing and forwarding, interconnection to a data network, policy enforcement, and data buffering, among others. In aspects where one or more portions of the network environment 200 are not structured according to the 3GPP 5G architecture, the UPF 222 may take other forms, such as a serving/packet gateway (S/PGW). Relevantly, the UPF 222 may be accessed by the first UE 202 in order for the first UE 202 to connect to the IMS core 230 and place (i.e., mobile originating (MO)) or receive (i.e., mobile terminating (MT)) a VoNR, VOLTE, or voice call, generally. In order to facilitate the call, the IMS core 230 may comprise one or more functions of modules; for example, in the 3GPP 5G architecture, the IMS core 230 may comprise at least one call session control function such as a proxy call session control function (P-CSCF) 232, a serving call session control function (S-CSCF), and an interrogating call session control function (I-CSCF). As illustrated in FIG. 2, in some aspects, the S-CSCF and I-CSCF may be combined as an S/I-CSCF 234; in other aspects, these two control functions may take the form of being separate modules, functions, or components. Regardless of their form, the call session control functions of the IMS core 230, such as the P-CSCF 232 and the S/I CSCF 234 are configured to permit the first UE 232 to place a call to a circuit switched domain such as a publically switched telephone network (PSTN) 244 (e.g., a non-VONR/VOLTE voice call) or to a second UE 242 via at least one other IMS network 240 (e.g., a VoNR or VOLTE call). In various non-3GPP 5G architectures, any one or more of the call session control functions may be replaced by one or more components (e.g., service or media gateways) that are configured to support interworking between an IP based transport network accessible by the first UE 202 and a circuit switched domain or other IP based transport network accessible by a destination telephonic device, such as the second UE 242.

Fraudulent activity detection may be conducted by any one or more modules or functions described herein, according to any one or more of the following procedures, alone or in combination. In a first procedure, a network function, such as the AMF 212, will determine that the first UE 202 is fraudulent if a threshold number of access requests (e.g., network attach requests or registration requests) are communicated from the first UE 202 to the network function within a predetermined amount of time (e.g., 10 requests in one minute (absolute method) or greater than 10% of requests received by the AMF 212 within a time period (relative method), wherein the thresholds and time periods are configurable by the network operator, carrier, or the like. In a second procedure, the network function, such as the AMF 212, will determine that the first UE 202 is fraudulent if a threshold number of requests are communicated from the first UE 202 to the network function and a threshold number of attach failures occur, within a predetermined time period (e.g., if the first UE 202 communicates at least 10 requests in one minute and more than 5 (absolute) or 50% (relative) of the attach requests result in attach failures), wherein the threshold number of requests, the failure threshold, and the time period are configurable by the network operator, carrier, or the like.

In a third procedure, the first UE 202 may be determined to be fraudulent if an identification failure occurs greater than a threshold amount; for example, when the first UE 202 communicates with the AMF 212 during the registration process, the AMF 212 may assign or allocate the first UE 202 with a temporary identifier, such as a global unique temporary identity (GUTI), which may, in aspects, comprise a globally unique AMF identifier and a temporary mobile subscriber identity. In implementations within the network environment 200 that is not structured according to the 3GPP 5G architecture (e.g., 3GPP architecture having an MME), the temporary identifier may be assigned by the module, component, entity, or network function responsible for handling network registration for the first UE 202. During certain call flows, such as paging, GUTI reallocation, UE attach/registration, or the like, the AMF 212 may attempt to associate a particular GUTI being used by the first UE 202 with a private device and/or user identifier (e.g., IMSI, permanent equipment identifier (PEI), subscription permanent identifier (SUPI), and the like). As used herein, if the AMF 212 is unable to resolve the temporary identifier with the private device/user identifier, then a GUTI failure results. In the third procedure, a fraudulent determination is made if greater than a threshold amount of GUTI failures occur within a predetermined time period. As with other procedures disclosed herein, the thresholds may be absolute (e.g., more than 5 failures) or relative (e.g., more than 5% of all failures per node, tracking area, geographic area, or the like) and may be associated with relatively short time periods (e.g., 1, 5, 60 minutes) or relatively longer time periods (e.g., 24 or 48 hours).

In a fourth procedure, the first UE 202 may be determined to be fraudulent based on unusual mobile-originating (MO) and/or mobile-terminating (MT) call attempts. As discussed above with respect to the IMS core 230, one or more CSCFs (e.g., the P-CSCF 232 and the S/I CSCF 234) may be generally responsible for facilitating voice calls according to various technologies such as voice over LTE (VOLTE), voice over new radio (VoNR), voice over IP (VOIP), or any other digital-based voice call technology, and non-digital or legacy telephonic networks, such as the PSTN 244. In a first aspect of the fourth procedure, the one or more CSCFs will determine that the first UE 202 is fraudulent if a threshold number of call attempts are communicated from the first UE 202 to the one or more CSCFs within a predetermined amount of time (e.g., 10 requests in one minute (absolute method), greater than 10% of requests received by the one or more CSCFs within a time period (relative to network method), or if a number of call attempts in a second time period is more than a threshold amount different (e.g., twice as many, 5 times, 10 times, etc.) from a number of call attempts in an earlier first time period (relative to subscriber method)), wherein the thresholds and time periods are configurable by the network operator, carrier, or the like. In a second aspect of the fourth procedure, the one or more CSCFs will determine that the first UE 202 is fraudulent if a threshold number of call attempts are communicated form the first UE 202 to the one or more CSCFs and a threshold number of call failures occur within a predetermined time period, using any one or more features described with respect to the second procedure.

In a fifth procedure, the first UE 202 may be determined to be fraudulent based on unusual mobile-originating (MO) and/or mobile-terminating (MT) messaging attempts. As discussed above with respect to the IMS core 230, one or more CSCFs (e.g., the P-CSCF 232 and the S/I CSCF 234) may be generally responsible for facilitating messaging (e.g., SMS messaging) according to various technologies, including IP SMS and traditional SMS. Though reference is made to one or more CSCFs, it should be noted that the fifth procedure may also be executed at any component, module, or function that is configured for facilitating or handling messaging services, such as the IP short message gateway (IPSMGW). In a first aspect of the fifth procedure, the one or more CSCFs will determine that the first UE 202 is fraudulent if a threshold number of messaging attempts are communicated from the first UE 202 to the one or more CSCFs within a predetermined amount of time (e.g., 10 requests in one minute (absolute method), greater than 10% of requests received by the one or more CSCFs within a time period (relative to network method), or if a number of messaging attempts in a second time period is more than a threshold amount different (e.g., twice as many, 5 times, 10 times, etc.) from a number of call attempts in an earlier first time period (relative to subscriber method)), wherein the thresholds and time periods are modifiably configurable by the network operator, carrier, or the like (i.e., the thresholds and time periods may be modified once configured). In a second aspect of the fourth procedure, the one or more CSCFs will determine that the first UE 202 is fraudulent if a threshold number of messaging attempts are communicated form the first UE 202 to the one or more CSCFs and a threshold number of messaging failures occur within a predetermined time period, using any one or more features described with respect to the second procedure.

Any procedure may be implemented as a continuous monitoring system or in response to another event. In a continuous monitoring aspect, the appropriate module, component, entity, or network function (e.g., the AMF 212, P-CSCF 232, S/I-CSCF 234) may continuously monitor traffic in accordance with any one or more of the fraudulent detection procedures disclosed herein and take an enforcement action upon a condition being met. In other aspect, a procedure may be implemented in response to a determination or in response to receiving an indication that a triggering event has occurred. The triggering event may include a determination that traffic at a particular location (node, tracking area, geographic area, NOC, or the like) is more than a threshold amount (e.g., traffic is greater than 75% capacity (absolute) or has increased by more than 50% over a period of time such as 5, 10, or 60 minutes (relative). The triggering event may include a determination that one or more key performance indicators (KPIs) has degraded greater than a threshold amount (e.g., degraded below a tripwire such as a downlink data rate less than 100 Mbps (absolute method) or degraded more than a threshold percentage, such as 25%, during a period of time, such as 5, 10, or 60 minutes (relative method)). The one or more KPIs may be at least one of a peak data rate, peak spectral efficiency, user-experienced data rate, area traffic capacity, latency in the user plane, connection density, average spectral efficiency, bandwidth, call drop rate, call failure rate, and other related performance factors that impact a wireless network's ability to provide desirable service to a legitimate user device.

Upon a condition being met according to one or more fraudulent detection procedures, the network environment 200 may take one or more enforcement actions. In a first aspect, the enforcement action may include the relevant network function automatically communicating (e.g., using the HTTP POST method, such as an Namf_EventNotification message, wherein the communication may comprise a SubscriptionID and/or EventID) with the EIR 214 that a fraudulent behavior has been detected, which may cause the EIR 214 to communicate an instruction to the UDR 220 (directly, or via one or more UDMs) to associate the suspect device with either a temporary or permanent prohibition of service (e.g., adding the permanent device/user identity to a blacklist), or to monitor the suspect device (e.g., adding the permanent device/user identity to a greylist). In practice, said instruction may comprise the EIR maintaining a separate list on the UDR (e.g., stored under the EIR subscription tree) with one or more service level restrictions (e.g., a greylist, blacklist, or whitelist). Said list may be accessed by other network functions as part of one or more call flows that are performed to facilitate providing a requested service for a UE, which could result in said one or more network functions preventing, limiting, and/or monitoring the provision of the requested service, based on the preferences of the network operator. Additionally or alternatively, said list may be maintained for inspection by one or more entities of the network operator (e.g., a human technician). In aspects of the present disclosure where one or more conditions are met according to any one or more of the fraudulent detection procedures described herein, the relevant network function (e.g., AMF or a CSCF) may use its interface (e.g., Namf or Ncsef) to communicate with the UDR.

In another aspect, the enforcement action may comprise causing an instruction to be communicated to the device subject to the enforcement action that the device may not communicate a subsequent attach/registration request to the AMF 212 or a call attempt to the IMS core 230. In yet another aspect, the enforcement action may comprise causing a notification to the relevant network operator and/or carrier, wherein the notification comprises information about the suspect device (e.g., permanent device/user identity) and suspect behavior information (how many attach/registration requests have been made (with or without regard to how many failures occurred), call attempts have been made, or SMS attempts have been made within a certain amount of time). In an aspect, the notification may further comprise an input prompt that requires the network operator/carrier (e.g., a technician in a network operation center) to select an action (e.g., no action, add device to gray/black list, suspend device access, monitor device behavior, contact customer/user associated with the permanent device/user identifier, and the like).

Figure 3:
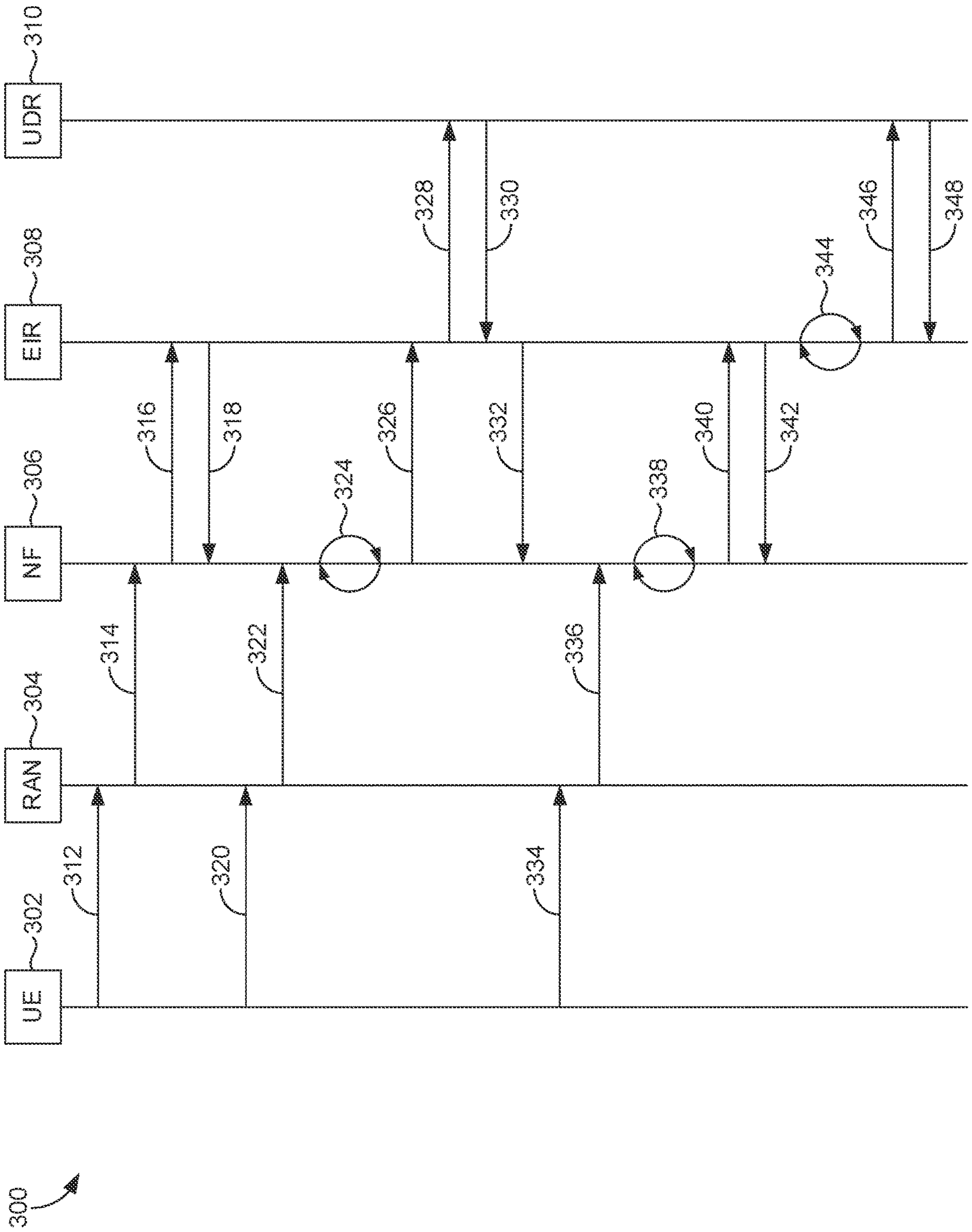
FIG. 3 illustrates a flow diagram of an exemplary method for filtering malicious or rogue devices in which implementations of the present disclosure may be employed.

Turning now to FIG. 3, a call flow diagram is illustrated in accordance with one or more aspects of the present disclosure. A call flow 300 may be said to exist between one or more components discussed in greater detail herein and is not meant to exhaustively show every interaction that would be necessary to practice the invention, so as not to obscure the inventive concept, but is instead meant to illustrate one or more potential interactions between components. The call flow 300 may be relevantly said to include a UE 302 (such as the first UE 202 of FIG. 2), a RAN 304 (such as the RAN 206 of FIG. 2), an NF 306 (such as the AMF 212 or one or more CSCF 232, 234 of FIG. 2), an EIR 308 (such as the EIR 214 of FIG. 2), and a UDR 310 (such as the UDR 220 of FIG. 2). At a first step 312, the UE 302 communicates a first request to the RAN 304 to access a network service. At a second step 314, the RAN 304 relays the request to the NF 306. In aspects where the network service requested by the UE 302 is a voice call, the NF 306 may take the form of a CSCF; in aspects where the network service requested by the UE 302 is messaging, the NF 306 may take the form of a CSCF of an IPSMGW; in other aspects, such as where the network service requested by the UE 302 is data, the NF 306 may comprise an AMF.

At a third step 316, the NF 306 communicates with the EIR 308 in order to determine if the UE 302 is authorized to access the requested network service. At a fourth step 318, the EIR communicates a response to the NF 306 that indicates whether the UE 302 is authorized to access the requested network service. At a fifth step 320, the UE communicates a second request to the RAN 304 to access the network service. In some aspects the second request may be due to the UE 302 being denied access to the previously requested network service based on a response from the EIR or a time out; in other aspects, the second request may be made before any response can be returned to the UE 302 from the first request. Regardless, at a sixth step 322, the RAN 304 relays the second request to the NF 306. At a seventh step 324, the NF performs a monitoring function in order to determine, for example, how many attempts have been made by the UE 302. In accordance with any one or more of the fraudulent detection procedures discussed with respect to FIG. 2, step 324, the NF 306 may make a first determination that fraudulent activity is taking place and report it, at an eighth step 326 to the EIR 308. At a ninth step 328, the EIR communicates an indication to the UDR 310 that the UE 302 is engaged in suspect behavior and to add the UE 302 to a suspect device list. In one aspect, at the ninth step 328, the EIR 308 may add the UE 302 to a lower level suspect device list (e.g., a gray list) that actively monitors subsequent activity from the UE 302 and/or limits access to certain network services (e.g., prevents access to voice but allows voice calls, or vice versa); in another aspect, at the ninth step 328, the EIR 308 may add the UE 302 to an upper level suspect device list (e.g., a blacklist) that prevents the UE 302 from accessing some or all network services (whether for a predetermined amount of time, such as 5 minutes, 30 minutes, an hour, or one or more days, or indefinitely).

At a tenth step 330, the UDR responds that the UE 302 has been added to the suspect device list as instructed by the EIR 308 at the ninth step 328. At an eleventh step 332, the EIR 308 communicates a response to the NF 306 regarding the report made at the eighth step 326, wherein said response may comprise an indication that said report has been received and acted upon. In aspects wherein the ninth step 328 results in a prohibition of network service for the UE 302, a third request for network services is communicated from the UE 302 to the RAN 304 at a twelfth step 334 (the term third is used only for relative sequencing, in practice, the initial request at the first step 312 may comprise a plurality of requests, the 'second' request at the fifth step 320 may also comprise a plurality of requests, wherein each of the requests are subsequent to the first plurality of requests at step 312, and the 'third' request at the twelfth step 334 may further comprise a plurality of requests, wherein each of said requests are subsequent to each of the plurality of second requests) and the RAN forwards the request at a thirteenth step 336 to the NF 306. In such an aspect, the NF 306 may query the EIR 308 and/or the UDR 310 in order to determine if the UE 302 is authorized for access and, based on a response that the UE 302 is prohibited, deny the UE 302 the requested network service. Alternatively, the NF 306 may comprise a self-referential storage, wherein the NF 306 is capable of locally storing service denial instructions based on the response from the EIR 308 at the eleventh step 332, permitting the NF 306 to deny access without the need for subsequent query(ies) to the EIR 308 and/or UDR 310.

In some aspects, particularly wherein the UE 302 is not added to the blacklist as a result of steps 326-332, the UE may communicate subsequent access requests, even after being identified as fraudulent. At a twelfth step 334, the UE 302 communicates an nth subsequent request to the RAN 304 to access a network service, wherein n is any number after the second request at step 320. At a thirteenth step 336, the RAN 304 relays the request to the NF 306. At a fourteenth step 338, the NF performs a monitoring function in order to determine, for example, how many subsequent attempts have been made by the UE 302. In accordance with any one or more of the fraudulent detection procedures discussed with respect to FIG. 2, step 338, the NF 306 may make a second determination that a higher level of fraudulent activity is taking place and report it, at an fifteenth step 340 to the EIR 308. At a sixteenth step 342, the EIR may respond to the NF 306 with an acknowledgement or other response. At a seventeenth step 344, the EIR 308 may monitor how many higher level fraudulent activity reports are received from the NF 306, and based on any one or more of the fraudulent detection procedures discussed with respect to FIG. 2, may add the UE 302 to a higher level suspect device list (e.g., a black list) which may limit or prevent access to some or all network services (whether for a predetermined amount of time, such as 5 minutes, 30 minutes, an hour, or one or more days, or indefinitely) by communicating with the UDR at an eighteenth step 346 and receiving an acknowledgment at a nineteenth step 348.

Figure 4:
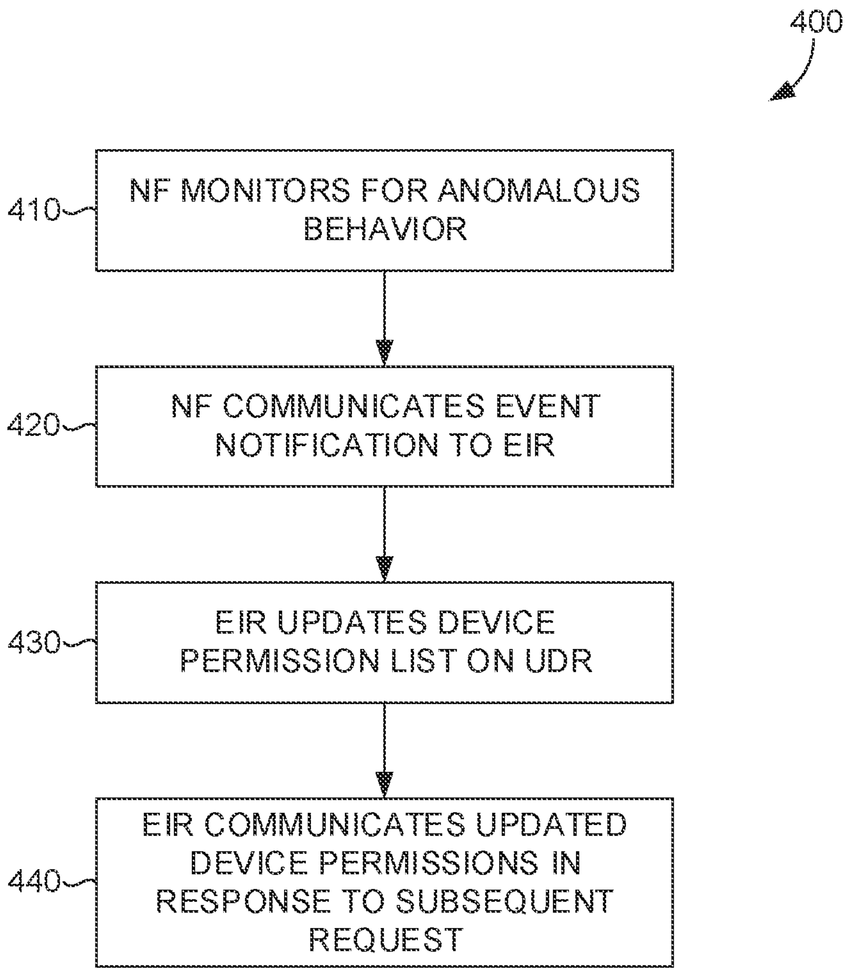
FIG. 4 illustrates a flow diagram of an exemplary method for updating device permission on a data repository in accordance with embodiments described herein.

Turning now to FIG. 4, a flow chart is provided that illustrates one or more aspects of the present disclosure relating to a method 400 for detecting and/or mitigating fraudulent activity filtering using an NF and/or EIR. At a first step 410, the NF monitors for anomalous behavior using any one or more of the features described with respect to any of the NFs identified and discussed in FIG. 2 (e.g., utilizing an NF such as an AMF to monitor the number of access requests received from a particular UE within a predetermined period of time). At a second step 420, the NF communicates an event notification to the EIR comprising an indication of either the activity that the NF has monitored (e.g., X number of access requests within Y amount of time, or access request rate exceeding Z threshold) and/or a more conclusory indication that the particular UE is suspected of fraudulent activity to the EIR, as described in greater detail with respect to FIGS. 2 and 3. At a third step 430, the EIR updates a device permission list on a UDR by communicating to the UDR and either adding the particular user device to a particular access list (e.g., a grey list or black list) or by modifying a previously-existing device permission level (e.g., modifying the particular device's affiliation from the white list to the grey list). In some aspects, and at some point subsequent to step 430, whether in response to a subsequent access request from the particular UE or in response to the update at step 430 (prior to a subsequent access request from the particular UE), the EIR communicates the updated device permissions to the NF, which causes the particular UE to have modified access level in response to access requests, in accordance with any one or more aspects of FIG. 2.

Figure 5:
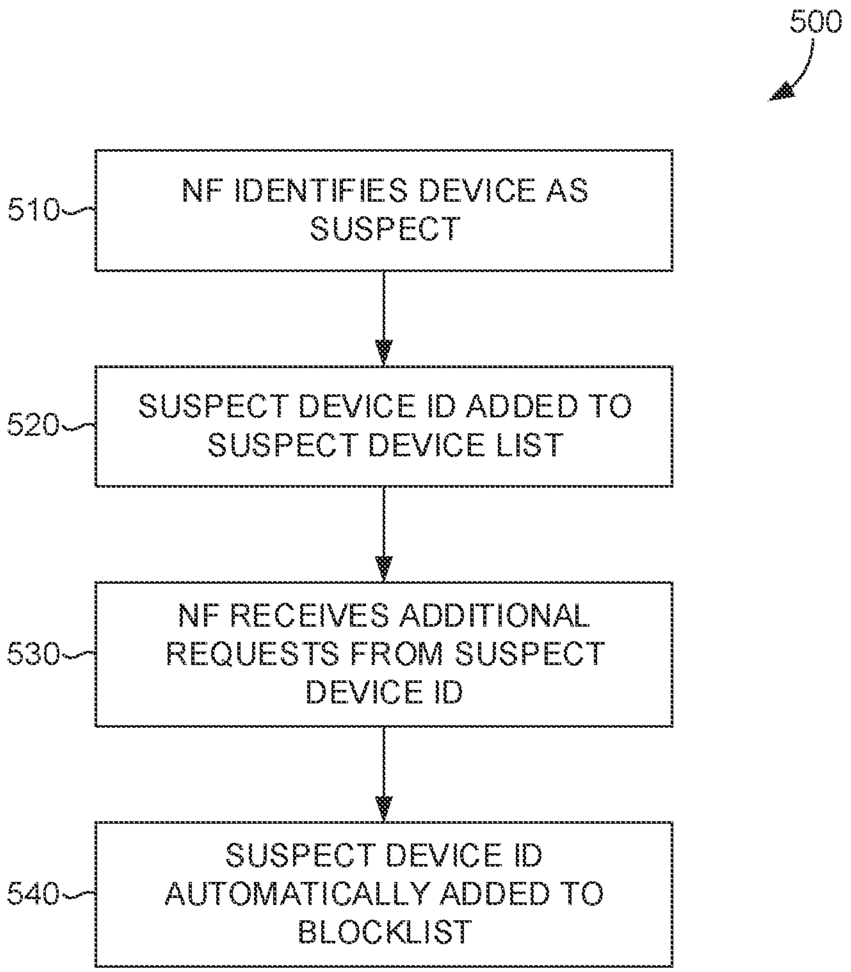
FIG. 5 depicts a flow diagram of an exemplary method for automated blacklisting devices, in accordance with embodiments described herein.

FIG. 5 is a flow chart illustrating one or more aspects of a method 500 for blacklisting a particular UE fraudulent activity filtering using an NF and/or EIR in accordance with the present disclosure. At a first step 510, the NF identifies the particular UE as suspect using any one or more features described with respect to step 324 of FIG. 3. At a second step 520, the particular UE is added to a suspect device list (e.g., a gray list) that actively monitors subsequent activity from the particular UE and/or limits access to certain network services, such as described in steps 326-332 of FIG. 3. At a subsequent step 530, the NF receives one or more requests from the particular UE to access network resources, despite now being on the suspect device list, such as step 334-336 of FIG. 3. In response to the subsequent access requests from the particular UE, a step 540, the particular UE is added to a higher level suspect device list (e.g., a blacklist that blocks some or all network access), in any one or more aspects of steps 338-348 of FIG. 3.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A method for suspect device filtering in a wireless communication network, the method comprising:

communicating, by an access network, a plurality of connection failure messages to a user device in response to receiving a plurality of requests for a network service from the user device, wherein the user device is associated with a permanent device identifier;

determining, by a first network function of a core network, and based at least in part on the plurality of connection failure messages communicated to the user device during a first predetermined time, that the user device is suspect, wherein the first network function is associated with the provision of the requested network service;

adding the user device to a suspect device list maintained on the first network function based on the determination that the user device is suspect;

receiving, at the radio access network, a subsequent request for the network service from the user device;

communicating the subsequent request for the network service from the radio access network to the first network function;

determining by the first network function, based on a query of a locally stored second suspect device list, that the user device is blacklisted;

communicating an access denial for the network service from the first network function to the user device, via the radio access network; and ignoring subsequent requests from the user device for the network service after the access denial is communicated, wherein determining that the user device is suspect comprises the network function determining that a number of the plurality of connection failure messages communicated to the user device within a predetermined time period exceeds a predetermined threshold, and wherein the suspect device list is a first-level suspect device list that limits access to one or more network services for the user device, and wherein the method further comprises, in response to receiving one or more additional requests from the user device after the user device is added to the first-level suspect device list, adding the user device to a higher-level suspect device list that prevents the user device from accessing the one or more network services.

2. The method of claim 1, wherein the predetermined threshold is a modifiably configurable parameter.

3. The method of claim 2, wherein the predetermined time period is a modifiably configurable parameter.

4. The method of claim 1, wherein the permanent device identifier comprises an international mobile station equipment identity (IMEI).

5. The method of claim 1, wherein the network function comprises an access mobility function, call session control function, or internet protocol multimedia system media gateway.

6. The method of claim 1, wherein determining that the user device is suspect further comprises the network function determining that a greater than threshold amount of temporary identity failures have occurred within a predetermined time period.

7. The method of claim 1, wherein the access denial is communicated to the user device without a subsequent query to the second network function.

8. A method for suspect device filtering in a wireless communication network, the method comprising:

determining that a triggering event has occurred in a geographic area, the triggering event comprising a threshold high utilization of one or more radio access network nodes in the geographic area;

subsequent to said determination, receiving, at a radio access network, a plurality of requests for a network service from a user device, wherein the user device is associated with a permanent device identifier;

communicating the plurality of requests for the network service to a network function, wherein the network function is associated with the provision of the requested network service;

determining, by the network function, and based at least in part on the receipt of the plurality of requests for the network service from the user device during a first predetermined time period and that the user device is located in the geographic area, that the user device is suspect;

adding the user device to a suspect device list, wherein the suspect device list is stored on a data repository; and ignoring subsequent requests from the user device for the network service after the access denial is communicated.

9. A method for suspect device filtering in a wireless communication network, the method comprising:

receiving, at a networked computer processing component, a plurality of requests for a network service from a device attempting to access one or more internet resources, wherein the device is associated with a permanent device identifier, and wherein the networked computer processing component is associated with a provider of internet service;

determining, by the networked computer processing component, and based at least in part on the receipt of the plurality of requests from the device during a first predetermined time period, that the device is suspect;

adding the device to a locally stored suspect device list maintained on the networked computer processing component;

receiving a subsequent request from the device at the networked computer processing component;

determining, based on a query of the locally stored suspect device list, that the device is blacklisted;

communicating an access denial from the networked computer processing component to the device; and ignoring subsequent requests from the user device for the network service after the access denial is communicated, wherein determining that the device is suspect comprises the networked computer processing component determining that a number of the plurality of requests that have been received by the networked computer processing component within a predetermined time period exceed a predetermined threshold, wherein the locally stored suspect device list is a first-level suspect device list that limits access to one or more network services for the device, and wherein the method further comprises, in response to receiving one or more additional requests from the device after the device is added to the first-level suspect device list, adding the device to a higher-level suspect device list that prevents the device from accessing the one or more network services list, adding the device to a higher-level suspect device list that prevents the device from accessing the one or more network services.

10. The method of claim 9, wherein the predetermined threshold is a modifiably configurable parameter.

11. The method of claim 10, wherein the predetermined time period is a modifiably configurable parameter.

12. The method of claim 9, wherein the permanent device identifier comprises an international mobile station equipment identity (IMEI).

13. The method of claim 9, wherein the networked computer processing component comprises an access mobility function, call session control function, or internet protocol multimedia system media gateway.

14. The method of claim 9, wherein determining that the user device is suspect further comprises the networked computer processing component determining that a greater than threshold amount of temporary identity failures have occurred within a predetermined time period.

15. The method of claim 9, further comprising communicating, based on the determination that the user device is suspect, an indication from the networked computer processing component to a second network function of the core network that causes the user device to be added to a second suspect device list maintained on the second network function, the second network function being one or more of a unified data repository and an equipment identity register, wherein the second network function is remote from the first network function.

16. The method of claim 15, further comprising associating the user device with the suspect device list in response to an acknowledgement from the second network function.

17. The method of claim 16, wherein the access denial is communicated to the user device without a subsequent query to the second network function.

18. The method of claim 9, wherein the method further comprises determining that a triggering event has occurred in a geographic area, the triggering event comprising one or more of a threshold high utilization of one or more radio access network nodes, a threshold high decrease in traffic capacity of one or more radio access network nodes, or a threshold large degradation of one or more key performance areas associated with providing wireless telecommunication service to the geographic area.

* * * * *